United States Patent [19]

Dobler et al.

[11] Patent Number: 4,494,401
[45] Date of Patent: Jan. 22, 1985

[54] PRESSURE SENSOR FOR THE COMBUSTION CHAMBER OF AN INTERNAL COMBUSTION ENGINE

[75] Inventors: Klaus Dobler, Gerlingen; Ulrich Schoor, Stuttgart; Rudolf Heinz, Renningen; Thomas Frey, Friolzheim; Werner Grünwald, Gerlingen, all of Fed. Rep. of Germany

[73] Assignee: Robert Bosch GmbH, Stuttgart, Fed. Rep. of Germany

[21] Appl. No.: 540,296

[22] Filed: Oct. 11, 1983

[30] Foreign Application Priority Data

Nov. 26, 1982 [DE] Fed. Rep. of Germany ....... 3243743

[51] Int. Cl.³ .............................................. G01L 23/22
[52] U.S. Cl. ............................................. 73/35; 73/714
[58] Field of Search ........................... 73/35, 115, 714

[56] References Cited

U.S. PATENT DOCUMENTS 2,864,972 12/1958 Li ......................................... 73/35 X
2,946,939 12/1960 Forrest ..................................... 73/35
4,227,403 10/1980 Dooley et al. ......................... 73/115

Primary Examiner—James J. Gill
Attorney, Agent, or Firm—Frishauf, Holtz, Goodman & Woodward

[57] ABSTRACT

To sense pressure within the combustion chamber of an internal combustion engine (ICE), a plug element which already extends into the combustion chamber of the ICE, such as a sparkplug, or a glow plug, has a layer-like resistor applied to a ceramic insulator extending into the combustion chamber, for example, directly on the central insulator of a sparkplug or on the side of a ceramic glow plug bushing or plug element. If applied to a sparkplug then, preferably, the heater is shielded by metallic layers, separated from the metallic shielding layers by insulating layers, of which the top metallic layer preferably is platinum or a platinum-type metal to catalyze combustion of residues which, otherwise, might collect on the top layer and interfere with proper sensor operation. The layer-like sensor and conductive tracks may be of thick film construction; stamp-on printing with flexible printing stamps is suitable to apply the layer-like resistors.

14 Claims, 2 Drawing Figures

PRESSURE SENSOR FOR THE COMBUSTION CHAMBER OF AN INTERNAL COMBUSTION ENGINE

Reference to related application, assigned to the assignee of the present application, the disclosure of which is hereby incorporated by reference:

U.S. Ser. No. 346,034, filed Jan. 28, 1982, Dobler, abandoned and refiled as a continuation Ser. No. 597,588, Apr. 10, 1984.

The present invention relates to a pressure sensor and more particularly to a sensor to determine the pressure in the combustion chamber of an internal combustion engine so that unusual, or undesired combustion events which may lead to engine knocking can be reliably, quickly and easily recognized.

BACKGROUND

The referenced application Ser. No. 346,034, filed Jan. 28, 1982, Dobler, refiled as Ser. No. 597,588, Apr. 10, 1984 assigned to the assignee of the present application (corresponding to the published international application WO No. 82/00520) describes a pressure sensor to determine knocking, or a tendency to knock of an internal combustion engine, by placing a pressure-sensitive resistor into the combustion chamber of the engine. The pressure sensor resistor can be formed as a layer-like resistor or as a wire-wound resistor; if a wire-wound resistor, it can be wound as a spiral positioned within the breathing space of a sparkplug, that is, in the space between the central insulator and the inner surface of the wall of the metal housing of the sparkplug. A layer-like resistor may also be used applied, for example, to the outside of a ceramic tube which is heated to pre-heat the combustion chamber of diesel engines.

THE INVENTION

It is an object to improve pressure sensors of the aforementioned type to facilitate separation of signals, for example due to sparking of a sparkplug, and of pressure events, and, further, to simplify the construction of resistors which are layer-like and in which the resistor material need not be of a type which also has to be an efficient heating element.

Briefly, a layer-like pressure-sensitive resistor is secured to a ceramic portion of the plug element which is introduced into the combustion chamber of the internal combustion engine (ICE), and which has operating effects with respect to the engine. Thus, the sensor in accordance with the present invention can be applied to an element already introduced through the cylinder wall, so that additional bores, threading, and sealing problems are avoided.

In accordance with the feature of the invention, the plug element is a sparkplug, and the layer-like pressure-sensitive resistor element is secured to the ceramic portion, for example the central insulator of the sparkplug. In accordance with another feature of the invention, the plug element is a ceramic plug forming a pre-heating, or pre-gluing plug for pre-heating the combustion chamber of a diesel engine, and the resistor is applied to the outside of the ceramic tube surrounding the heater portion of the glow plug which, otherwise, can be of standard and well-known construction.

In accordance with a preferred feature of the invention, the pressure-sensitive layer-like resistor is sandwiched between shielding metallizing layers, which shield the resistor from stray electrical influences, for example, due to sparking of the sparkplug. This shielding or metallized layer effectively shields the sensor with respect to interfering electrical fields which occur upon sparking. The material of the layer-like resistor can be selected for optimum use as a pressure-sensing resistor. Materials of this type are suitable in the present invention, as is well-known, and reference is made also to the aforementioned referenced Dobler application Ser. No. 346,034.

DRAWINGS

FIG. 1 is a partly broken away view of the inner end portion of a sparkplug having the sensor of the present invention applied to the central insulator thereof; and FIG. 2 is a fragmentary side view of a glow plug element for use with a diesel engine, in which all portions not necessary for an understanding of the present invention, such as housing structures and the like have been omitted.

DETAILED DESCRIPTION

Figure 1:
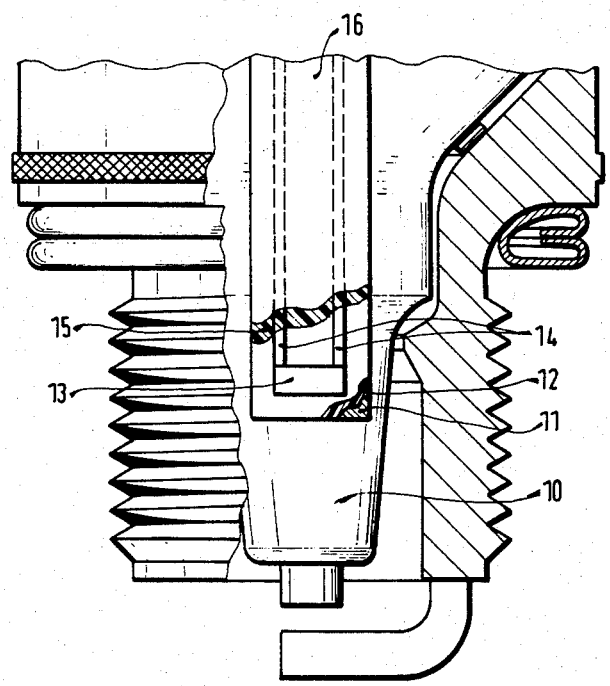

A sparkplug, as shown in FIG. 1, has a ceramic central insulator 10 on which the sensor of the present invention is applied. The insulator 10 has a plurality of layers applied thereto. The first layer, closest to the insulator 10, is a metallic shielding layer 11. The metallic shielding layer 11 has an insulating layer 12 applied thereto. The two layers 11, 12 separate the sensor itself from the sparkplug insulator.

The sensor itself comprises a resistance layer 13, which is electrically connected—for example by utilization of the same material as the layer 13—to a pair of conductive leads or tracks 14, which are placed above the insulating layer 12 and extend outwardly of the sparkplug to a suitable pressure-sensing connector. The pressure-sensitive resistance layer 13 has a further insulating layer 15 applied thereto on which a second metallic shielding layer 16 is applied. An additional protective layer can be applied over the layer 16, but is not needed, and not shown in the figure. The shielding layers 11 and 16 may be made of platinum, or other electrically conductive material which can be applied in an extremely thin film. They are used to permit reliable and complete electrical shielding of the sensor layer 13. The second metallic layer 16, in combination with the cover layer 15, completely prevents any influence of the combustion gases on the electrical resistor of the sensor, for example in the form of deposits, or chemical changes. The platinum, or a platinum-type metal, has catalytic effects and ensures combustion of any residues. Omitting a further layer on top of layer 16 within the combustion chamber of the sparkplug ensures freedom from deposits due to the combustion in the combustion chamber of the ICE. The center electrode, the ground or chassis electrode of the sparkplug and other components are conventional.

The insulator 10 is part-conical, and, in plan view, circular. The respective layers can be applied by any suitable process, for example by printing with a flexible printing stamp element, which is suitable for curved surfaces. One such printing process is known as the tampo print method.

Figure 2:
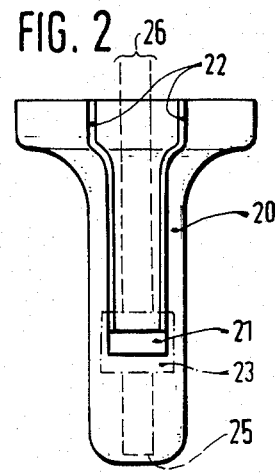

The plug element on which the sensor is applied need not be a sparkplug; FIG. 2 illustrates a sensor in accordance with the present invention applied to a glow plug for use with a diesel engine. Glow plugs of the type for which the present invention is suitable include an outer ceramic tube 20. The sensor resistor 21 is applied as a thick film layer, and connected to conductive tracks 22, preferably of the same material as the sensor, and directly printed on the ceramic tube 20 of the glow plug. Intermediate shielding layers, and the necessary insulators, are not needed since no sparks occur within the diesel engine. A protective cover layer 23 which is pressure-transmissive, for example a glass cover not adhered to the ceramic protects the resistor 21. The heating resistor 25 and the connecting lines 26 therefor, applied, for example, to the hidden side of the plug tube form a circuit which is separate from the conductive tracks 22 which carry pressure-sensing signals. The pressure-sensing signals can be conducted to an external evaluation circuit, of any suitable construction, independently of electrical power supply to the heater resistance 25 on the plug 20.

Various changes and modifications may be made and features described in connection with any one of the embodiments may be used with any of the others within the scope of the inventive concept.

A suitable material for the resistance layer 13 is: Cermet resistor, usually for their film technology.

The thickness of the layer 13 is: about 10 μm.

A suitable material for the layer 21 is: Cermet resistor.

The thickness of the layer 21 is: about 10 μm.

A suitable material for the insulating layers 12, 15 is: medium melting glass, melting point about 850° C.

Suitable materials for the metallizing layers 11, 16, other than platinum: palladium, rhodium, tungsten or mixtures or compounds.

Thickness of the layers 11, 16: 5-10 μm.

The shielding layers 11, 16 may be left unconnected, or may be connected electrically to, preferably, the chassis or ground or housing electrode of the plug, for example the sparkplug of FIG. 1.

We claim:

1. Pressure sensor to determine pressures within the combustion chamber of an internal combustion engine having a plug element including a ceramic portion adapted for introduction into the combustion chamber of the internal combustion engine, and a sensor element (13, 21) comprising a layer-like resistor made of a material which, under influence of pressure to which the resistor is exposed, changes its resistance, supported on the plug element wherein, in accordance with the invention, the layer-like pressure-sensitive resistor is formed as a layer on the surface of the ceramic portion of the plug element.

2. Sensor according to claim 1, wherein the resistor (13,21) comprises a pressure-sensitive material resistance layer and electrical connections therefor formed as conductive tracks (14,22) supported on a ceramic portion of the plug element.

3. Sensor according to claim 2, further including two insulating layers (12,15) covering the layer-like resistor and the conductive tracks on both sides thereof;

and two metallic shielding layers (11,16) between which the insulating layers are positioned, one (11) of the conductive shielding layer being applied to the ceramic plug element and forming a support therefor, in the following order:

one (12) of the insulating layers;
   the pressure-sensitive resistor (13) and the connecting tracks (14) therefor;
   the other (15) insulating layer; and
   the other (16) metallic shielding layer.

4. Sensor according to claim 1, wherein the plug element is a sparkplug.

5. Sensor according to claim 1, wherein the plug element is a glow plug.

6. Pressure sensor and sparkplug combination, in which the pressure sensor determines pressures within the combustion chamber of an externally ignited internal combustion engine comprising a sparkplug central insulator (10) having a ceramic, approximately conical portion, adapted for introduction into the combustion portion, adapted for introduction into the combustion chamber of the internal combustion engine, and a sensor element (13) comprising a resistance element made of a material which, under the influence of pressure to which the resistance element is exposed, changes its resistance, supported on the sparkplug, wherein, in accordance with the invention, the resistance element comprises a layer-like pressure-sensitive resistor (13) formed as a layer on the surface of the ceramic insulator of the sparkplug on an outer wall surface of the insulator.

7. Sensor according to claim 6, wherein the layer-like pressure-sensitive resistor is a printed-on film element.

8. Sensor according to claim 6, further including conductive tracks (14) extending along the central insulator of the sparkplug;

and a combination metallic shielding-insulator sandwich secured on the central insulator of the sparkplug and supporting the layer-like resistor (13) and arranged on the insulator in the following order:

a metallic layer (11) located on the insulator (10) and positioned on an area at least as large as that of the area covered by the layer-like resistor (13) and the conductive tracks (14);
   an insulating layer (12), the resistor (13) and the conductive tracks (14);
   a top insulating layer (15);
   and a top metallizing layer (16).

9. Sensor according to claim 8, wherein at least the top metallizing layer comprises a metal which has catalytic effects on combustion wihtin the combustion chamber of the internal combustion engine to prevent accumulation of deposits on the top metallizing layer (16).

10. Pressure sensor-glow plug combination to determine pressures within the combustion chamber of an internal combustion engine and provide for pre-heating of the combustion chamber of the internal combustion engine having a plug element (20) including a ceramic portion adapted for introduction into the combustion chamber of the internal combustion engine, to form the outer cover of a pre-glowing, or pre-heating plug and to support an electrical heating element (25)

and a sensor element (21) composed of a layer-like resistor made of a material which, under the influence of pressure to which the resistor is exposed, changes its resistance, supported on the ceramic plug element, wherein, in accordance with the invention, the layer-like resistor (21) is formed as a layer on the surface of the ceramic plug element at a position spaced from an electrical heating element (25) for the pre-heating plug, and electrically separate from terminals (26) connected to said resistor.

11. Sensor according to claim 10, wherein said pressure-sensitive resistor is a thick film resistor (21).

12. Sensor according to claim 10, further comprising a protective top layer (23) applied over said resistor (21) which is pressure-sensitive.

13. Sensor according to claim 10, further including conductive tracks (22) connected to said pressure-sensitive resistor (21) and electrically separate from conductors (26) connected to the heating element (25) of the pre-heating plug.

14. Sensor according to claim 10, further including metallic shielding layers (11,16) located above and below—with respect to the ceramic tube 20—of the pressure-sensitive resistor (21);

and insulating layers (12,15) separating the metallic shielding layers and the pressure-sensitive resistor.

* * * * *